United States Patent [19]
Buckmaster et al.

[11] Patent Number: 5,945,478
[45] Date of Patent: Aug. 31, 1999

[54] HIGH SPEED EXTRUSION

[75] Inventors: Marlin Dwight Buckmaster, Vienna, W. Va.; Stuart Karl Randa, Wilmington, Del.

[73] Assignee: E. I. du Pont de Nemours and Company, Wilmington, Del.

[21] Appl. No.: 08/881,957

[22] Filed: Jun. 25, 1997

Related U.S. Application Data

[62] Division of application No. 08/632,376, Apr. 10, 1996, Pat. No. 5,688,457.

[51] Int. Cl.$^6$ ....................................................... C08K 5/02
[52] U.S. Cl. ........................... 524/650; 524/700; 524/701; 524/714; 524/742; 524/745; 524/779; 524/792; 524/795
[58] Field of Search ..................................... 524/650, 700, 524/701, 714, 742, 745, 779, 792, 795

[56] References Cited

U.S. PATENT DOCUMENTS

| 3,072,583 | 1/1963 | Randa . | |
|---|---|---|---|
| 3,125,547 | 3/1964 | Blatz . | |
| 4,304,713 | 12/1981 | Perelman | 264/45.9 |
| 5,180,754 | 1/1993 | Morita et al. | 521/85 |
| 5,314,925 | 5/1994 | Burnell et al. | 521/92 |
| 5,340,843 | 8/1994 | Tsuruta et al. | 521/79 |
| 5,346,926 | 9/1994 | Sakamoto et al. | 521/81 |

FOREIGN PATENT DOCUMENTS

| 0504418 A1 | 9/1992 | European Pat. Off. . |
|---|---|---|
| 04-93221 | 3/1992 | Japan . |

OTHER PUBLICATIONS

Rudin et al., "Fluorocarbon Elastomer aids polyolefin extrusion", Plastics Engineering, pp. 63–66 Mar. 1986.

*Primary Examiner*—John M. Cooney, Jr.

[57] ABSTRACT

Extrusion rheology of thermoplastic polymer as manifested by surface smoothness is improved by incorporating foam cell nucleating agents into the polymer and extruding the polymer under laminar flow to form unfoamed extrudate.

7 Claims, 1 Drawing Sheet

HIGH SPEED EXTRUSION

This is a division of application Ser. No. 08/632,376, filed Apr. 10, 1996, which is now U.S. Pat. No. 8,688,457.

FIELD OF THE INVENTION

This invention relates to the use of additives to increase extrusion rate of thermoplastic polymer.

BACKGROUND OF THE INVENTION

U.S. Pat. No. 2,991,508 discloses the extrusion of smooth-surfaced articles such as film and wire coatings of thermoplastic polymer. As the extrusion rate increases to reach the critical extrusion rate, the surface of the extrudate becomes rough. Upon further increase in extrusion rate, the super shear rate is reached, at which the extrudate surface becomes smooth again. As the extrusion rate is further increased, the extrudate surface becomes rough again, representing the maximum extrusion (shear) rate for the polymer. Usually, the surface roughening just above the critical shear rate has the appearance of sharkskin, i.e. a satin appearance, with the roughness of the surface similar to the texture of very fine sandpaper, barely perceptible to the touch. The severity of the roughness may increase to the point where the surface roughness is clearly visible as surface irregularities and these can be felt by touch. This surface roughness is commonly referred to as gross melt fracture. The surface roughening occuring as the extrusion rate is increased above the super shear rate is gross melt fracture. Thus, it is gross melt fracture that usually forms the limitation on the shear of the polymer and thus its maximum extrusion rate. Some polymers do not exhibit the super shear phenomonon, i.e. the the extrudate surface transforms from being smooth to sharkskin to gross melt fracture, while other polymers transform from smooth surface to gross melt fracture. For many applications, just the sharkskin appearance is objectionable and the extrusion rate at which this occurs forms the maximum extrusion rate.

U.S. Pat. No. 3,125,547 discloses the use of certain fluoropolymers as processing aids in the extrusion of hydrocarbon polymers. This patent was followed by improvements in the fluoropolymer used as the processing aid and combinations of fluoropolymer with certain additives, such as polyethylene glycol and or polar-side-group adjuvants. Generally, the processing aids are effective in postponing the occurence of sharkskin as extrusion rate is increased, but have little effect on the extrusion rate at which gross melt fracture occurs.

Improvement is still needed in the maximum extrusion rate attainable for thermoplastic polymer which is extrusion rate limited by extrudate surface roughness, whether sharkskin or especially, gross melt fracture.

SUMMARY OF THE INVENTION

The present invention involves the discovery that foam cell nucleating agents when added to the thermoplastic polymer act as very effective processing aids to enable the maximum extrusion rate to be increased before the extrudate surface changes from smooth to rough. Foam cell nucleating agents are normally used to nucleate the formation of voids in polymer extrudate, so that a foamed extrudate containing small cells is formed by virtue of the presence of blowing agent in the molten resin at the time of extrusion. The foamed extrudate will usually have a void content of at least 20%. U.S. Pat. No. 4,764,538 discloses that boron nitride has been the nucleant of choice for foaming fluoropolymers and that the addition of certain amounts of inorganic salts gives enhanced foam nucleation.

In the melt extrusion process of the present invention, foam cell nucleating agent is present in the polymer, but without blowing agent being present at the time of extrusion, so that the extruded polymer is unfoamed.

Thus, the process of the present invention comprises melt extruding unfoamed extrudate of thermoplastic polymer at a shear rate which is at least 1.2 times the shear rate at which said extrudate would otherwise become rough-surfaced, said polymer having incorporated therein an effective amount of foam cell nucleating agent to enable extrudate to have a smooth surface.

In one embodiment of this process, the shear rate is at least 1.2 times the shear rate at which the extrudate normally exhibits gross melt fracture. In this embodiment, the extrudate is either smooth surfaced or may have sharkskin in applications where such appearance is permitted. Preferably, the shear rate is at least 1.5 times the shear rate at which the extrudate would otherwise exhibit gross melt fracture and the extrudate is smooth surfaced.

The reference to the shear rate at which the extrudate exhibits surface roughness, should be understood to mean the shear rate at which the onset of roughness occurs when the foam cell nucleating agent is not present.

Another requirement of the process of the present invention is that the extruding of the thermoplastic polmer to form the unfoamed extrudate is carried out so that the molten polymer is under laminar flow condition as it forms the extrudate, i.e. as it exits the extrusion die. The extrusion carried out under laminar flow condition in combination with the presence of the effective amount of foam cell nucleating agent that provides the improved extrudibility of the present invention.

The significance of the laminar flow condition is seen from the fact that determination of the super extrusion shear rate in the '508 patent was carried out using a laboratory rheometer, which is the typical equipment used for testing extrudability, prior to using a commercial extruder. The improved extrudability of the present invention was not obtained using the rheometer on fluoropolymer composition containing the foam cell nucleating agent, but was obtained when using a commercial extruder having a crosshead for wire coating with the polymer extrudate of the same composition. Thus, it was surprising that the shear rate for the polymer containing the nucleating agent could be increased beyond what was predicted to be the maximum shear from rheometer experiments. It was determined that the equipment geometry was responsible for the improved results. The extruder crosshead provided laminar flow of the molten resin as it formed the extrudate. The rheometer had a relatively large die inlet angle, i.e. 90 degrees, which created turbulence in the molten polymer just prior to extrusion, and this turbulence manifested itself as gross melt fracture present in the extrudate.

The present invention also provides several new resin compositions which can be in either the pre-extruded state as extrudible composition or post extrusion as the extrudate in such forms as wire insulation, jacketing, tubing, rod and film. In one embodiment of the composition, the thermoplastic polymer is fluoropolymer and the foam cell nucleating agent is boron nitride. U.S. Pat. No. 4,764,538 discloses the amount of boron nitride to be used for nucleating foam cells in fluoropolymer is at least 0.5 wt % when used by itself and at least 0.05 wt % when used with 25 to 1000 ppm of inorganic salt which is thermally stable at the extrusion temperature. In commercial foaming practice, the amount of boron nitride used has been about 0.25 wt % and the amount of inorganic salt used has been about 100 ppm. In this compositional embodiment of the present invention, the amount of boron nitride effective to improve the extrusion performance of the fluoropolymer to make unfoamed extrudate can be less than 0.02 wt %.

In another embodiment of the composition, the thermoplastic polymer is polyolefin and the foam cell nucleating agent is boron nitride also present in an amount which can be less than 0.02 wt % to improve extrusion performance to make unfoamed extrudate.

DESCRIPTION OF THE DRAWING

The FIGURE shows a side view in cross-section of an extrusion die adapted to provide laminar flow of molten polymer forming unfoamed extrudate.

DETAILED DESCRIPTION OF THE PRESENT INVENTION

Figure 1:
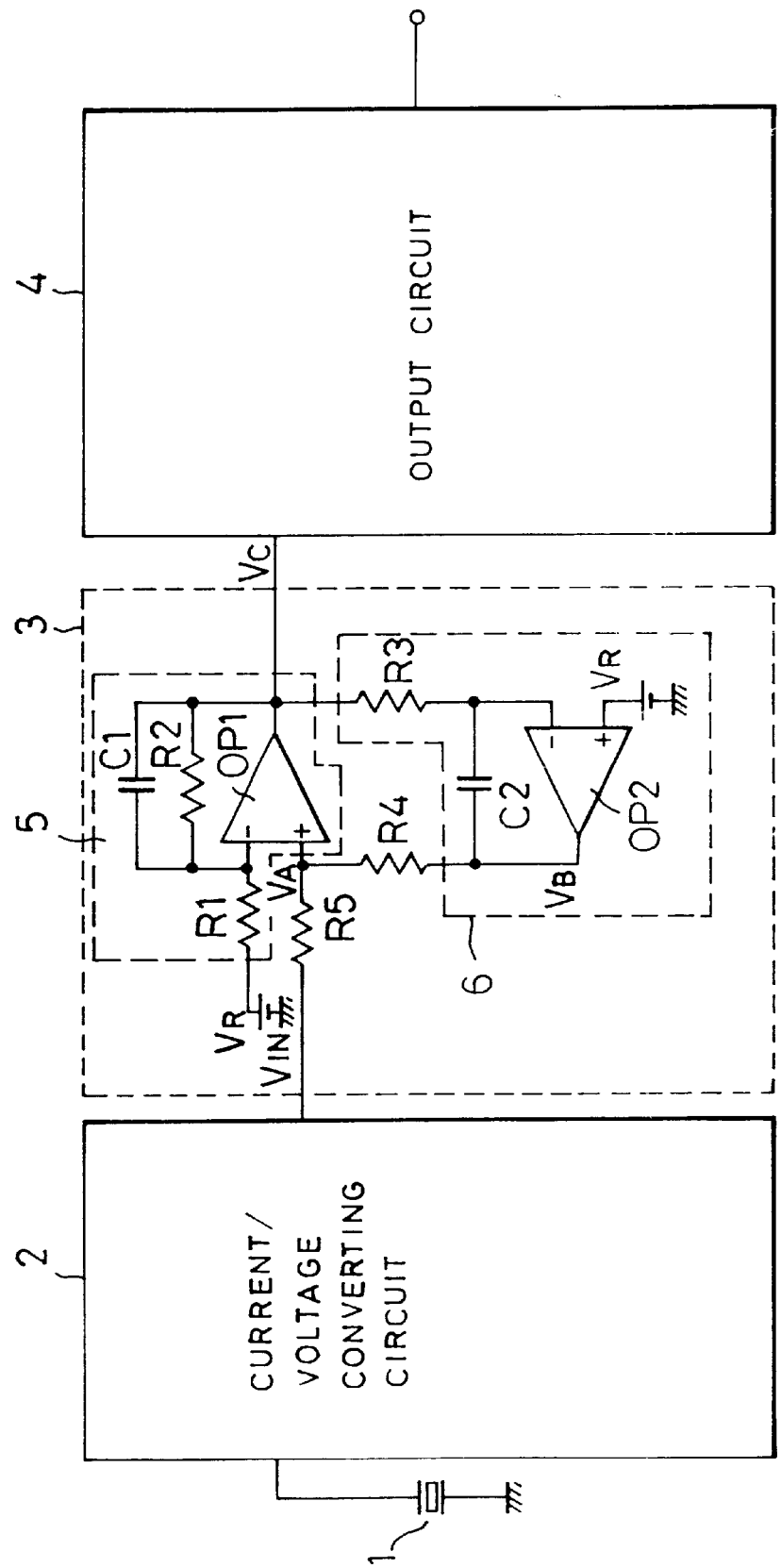

In the FIGURE, an extrusion die 2 is shown having an internal die passage 4 which terminates in an orifice 8 through which molten thermoplastic polymer 10 is extruded. The molten polymer is supplied by an extruder (not shown) which forces the molten polymer into die 2 through annular inlet port 11 entering the die from its side. The die 2 is shown in indeterminate length, indicating that the inlet port 11 is spaced considerably from the orifice 8. The die 2 has a conical interior surface 12 which tapers inwardly to form a smooth transistion with the inlet to the die passage 4. A wire guide 16 is positioned within the conical interior surface 12 and has a central passage 18 through which wire 20 passes in the direction indicated, a conical exterior surface 22, and a cylindrical extension 24 which forms a smooth transistion with surface 22 extending the length of the die passage 4 and terminating at the die orifice 8. The die orifice 8, die passage 4, conical interior surface 12, and wire guide 16 are concentrically positioned and symmetrical about the axis 6. The included angle of the conical interior surface 12 is indicated as 14 in the FIGURE, and can be referred to as the die inlet angle. The included angle of the conical surface 22 of the wire guide 16 is indicated as 28 in the FIGURE. Collectively, these angles may be referred to as the conical angles.

The molten polymer enters the die 2 via port 11 and is forced around the wire guide 16 towards the die orifice 8. The wire guide serves as a mandrel for the molten polymer, giving the extrudate 10 a tubular shape. The die passage 4 forms the exterior surface of the tubular shape and the exterior surface of the cylindrical extension 24 forms the interior surface of the tubular shape. The greater speed of the wire as compared to the polymer extrusion rate causes the polymer coming into contact with the wire at a point remote from the die orifice 8 to draw down to a thinner cross-section, forming a thin polymer coating 26 on the wire, which will serve as electrical insulation. This is a melt draw-down extrusion process, and the draw down ratio (ratio of die orifice area to cross-sectional area of the polymer insulation) of the polymer will generally be at least 5:1, although the process of the present invention is applicable to pressure extrusion in which there is no draw down.

In the embodiment shown in the FIGURE, laminar flow of the molten polymer is achieved by the time the molten polymer enters the die inlet, which is the transistion between the conical interior surface 12 of the die 2 and the die passage 4. The molten polymer thus flows laminarly along the die passage and out the die orifice 8 enabling the improved extrudibility of the present invention to be obtained, i.e. when the thermoplastic polymer contains the foam cell nucleating agent. Gross melt fracture is accompanied by turbulence within the molten polymer at the die inlet, which is indicative of a region of very high shear stress. Laminar flow of the molten polymer in accordance with the present invention is a consequence of low shear stress being present in this region. The turbulence within the molten polymer can be seen when the extruder material of construction in the region of the die inlet is glass so that the movement of the molten resin within this region can be seen. Such turbulence includes the molten resin even reversing its direction of movement through the extruder at the die inlet, in the nature of eddy currents. Since extruders and extrusion dies are not normally made of glass as the material of construction, the presence of this turbulence cannot normally be seen, but is deduced as being present when the extrusion produces a rough-surface extrudate. Similarly, the absence of turbulence, i.e., the presence of laminar flow, is deduced from the smooth surface of the extrudate. This laminar flow may take the form of the molten resin moving into and through the die at a faster rate in the center of the extrudate then the resin moves along the die passage, i.e. the molten resin may tend to adhere to the wall of the die passage. Laminar flow may also take the form of "plug flow", wherein the molten resin slips along the wall of the die passage rather than adhere to it, so the resin moves as a plug along the die passage.

Laminar flow in the molten polymer entering the die inlet is achieved by substantial conformation of the coaxially interfitted conical surfaces 12 and 22, i.e. substantial conformation of the die inlet angle 14 and the included angle 28 of the conical surface 22 of the wire guide. Preferably the included angle of the conical surface 22 or mandrel is within 20 degrees of the die inlet angle, more preferably within 10 degrees thereof. In the embodiment shown in the FIGURE, the die inlet angle is about 60 degrees. Preferably, the die inlet angle is 30 to 70 degrees, and most preferably, the conical angles (included angle of the conical surface 22 and die inlet angle) are substantially the same, with the conical surfaces 12 and 22 being substantially parallel to one another, whereby the annulus between the conical surfaces is of uniform width along the pathway for the molten polymers. The result of this conformation of the conical surfaces is that the molten polymer entering the die via port 11 envelops the mandrel and flows along the conically converging annular path defined by surfaces 12 and 22, to enter the die inlet essentially without turbulence, for extrusion through the die orifice without the occurrence of unfoamed extrudable surface roughening.

While the presence of laminar flow is established by equipment geometry which streamlines the flow of molten polymer into the die inlet, achievement of the laminar flow is judged by the extrusion result, i.e. the nucleating agent in the thermoplastic polymer enables the extrusion rate to be increased beyond the maximum at which surface roughening of the extrudate otherwise occurs, without obtaining the surface roughening.

While laminar flow of the polymer is important to achieving a smooth-surface extrudate, it is also important that the foam cell nucleating agent be present in an effective amount. It is the combination of laminar flow of the molten polymer within the extrusion die as the polymer enters the die passage, with the presence of the foam cell nucleating agent that enables the shear rate for smooth-surface unfoamed extrudate to be increased beyond the maximum shear rate attainable for smooth surface extrudate when only laminar flow is present.

The extrusion die 2 shown in the FIGURE is used for wire coating and is situated in a cross-head positioned at the outlet end of a wire-coating extruder (not shown), wherein the molten polymer exits the extruder via port 11 into the die arranged at a right angle to the path of the molten polymer exiting the extruder, so that a wire may be passed through the die for eventual contact by the polymer as shown in the FIGURE. The wire may be omitted and the extrudate will be in the form of tubing.

If the wire guide 16 were omitted altogether, in which case the die 2 could be positioned in line with the longitudinal axis of the extruder instead of perpendicular as in the case of the crosshead arrangement, the molten polymer would have turbulence as it enters the die passage 4, and the improved extrusion performance will not be obtained. Such an extruder/die arrangement would operate similar to a rheometer as described above. The present invention, however, includes that discovery of foam cell nucleating agents which enable such apparatus to yield improved extrusion performance, i.e. the effectiveness of these agents is such that a wider range of die configuration and geometry can be used to provide the laminar flow necessary to obtain the improved results.

Achievement of the laminar flow condition is normally established upstream of the die passage 4, otherwise the length of the die passage would have to be inordinately long. As indicated above, the laminar flow condition is obtained by providing a pathway for the molten polymer which feeds the polymer to the die inlet. Preferably, the combination of the laminar flow condition achieved by extrusion equipment geometry and the presence of an effective amount of the foam cell nucleating agent are such that the shear rate can be increased by at least 2 times greater than the maximum shear rate at which surface roughness would otherwise occur, but without surface roughening of the extrudate occuring, and more preferably, this effect is achieved with respect to the occurence of gross melt fracture. Increases in shear of at least 10× are possible in operations under the present invention.

The extrusion die shown in the FIGURE is one way of forcing molten polymer through an orifice. The orifice need not be circular but can have other annular shapes. The extrusion process of the present invention is also applicable to the operation of other apparatus which forces molten polymer through an orifice, e.g. injection molding, blow molding, extrusion of film, including sheet. One skilled in the art, will be able to adapt the various apparatus possibilities to produce laminar flow of the molten polymer as it exits the extrusion orifice, regardless of its shape.

The surfaces of the unfoamed extrudate need to be smooth on the interior as well as the exterior, even in the case of wire coating, so that the resulting insulation on the wire is in intimate contact with the wire. Generally, if the exterior surface is smooth, the interior surface will also be smooth, so that it is usually only necessary to monitor the exterior surface of the extrudate for smoothness. In the initial equipment setup, however, it may be desirable to examine the interior surface to confirm its smoothness under shear rate at which the exterior surface is smooth.

Boron nitride is a preferred foam cell nucleating agent because of its applicability to a broad range of thermoplastic polymers, e.g., both fluoropolymer and polyolefin, and because it seems to provide the greatest improvement in extrudability (extrusion rate) above the rate at which the extrudate surface otherwise becomes rough. Use of boron nitride is especially effective in enabling the increase in shear rate, and thus production rate, to produce smooth-surface unfoamed extrudate of at least 10 times greater than the shear rate at which the extrudate surface otherwise becomes rough. The preferred amount of boron nitride effective to provide improved extrusion performance to obtain unfoamed extrudate can be as little as from 0.001 to 0.015 wt %, more preferably from 0.005 to 0.01 wt %. Thermoplastic polymers containing these quantities of boron nitride are additional embodiments of the present invention, with fluoropolymers and polyolefins, being the preferred polymers. Thermoplastic polymers containing the low amounts of BN, in steady state extrusion, may be advantageously preceded by a short run of higher BN content of the same polymer to condition the extruder.

Thermally stable inorganic salt may also be used in combination with the boron nitride. Generally the amount of inorganic salt used will be from 0.001 to 0.05 wt %, preferably from 0.002 to 0.04 wt %. Examples of inorganic salts include calcium tetraborate, sodium tetraborate, potassium tetraborate, calcium carbonate, and zinc tetraborate.

The present invention has also found that many other foam cell nucleating agents are operable to enable the extrusion shear rate to be increased without causing surface roughness of the unfoamed extrudate. At least one foam cell nucleating agent is used and, often a combination of foam cell nucleating agents are used. Such foam cell nucleating agents can be organic or inorganic and all have thermal stability under the conditions of extrusion, i.e. they do not decompose to cause bubble formation. They are also solid under the extrusion conditions, except that certain foam cell nucleating agents may at least partially dissolve in (disappear into) the molten polymer as will be hereinafter described.

Examples of organic foam cell nucleating agents include low molecular weight polytetrafluoroethylene, often called PTFE micropowder, the low molecular weight being characterized by a melt viscosity of $1\times10^3$ to $1\times10^5$ Pa.s at 372° C. This nucleating agent is more effective in polyolefins as compared to fluoropolymers.

Additional examples of nucleating agents include the fluorinated sulfonic and phosphonic acids and salts disclosed in U.S. Pat. No. 5,023,279, such as Telomer B sulfonic acid having the formula $F(CF_2)_nCH_2CH_2SO_3H$, wherein n is an integer of 6 to 12, wherein the particular Telomer® B is identified by the predominant value of the integer "n", e.g. BaS-10 is the barium salt of the sulfonic acid wherein n=10 as the predominant chain length present. Additional salts include BaS-8, ZrS-10, CrS-10, FeS-10, CeS-10, and CaS-10. For lower melting thermoplastic polymers, e.g. polyolefin, hydrocarbon salts of these long chain sulfonic or phosphonic acids can be used, such as BaS-3H and KS-1(H), i.e. barium propane sulfonate and potassium methane sulfonate, respectively. The eight-carbon perfluorinated sulfonic acid available as Fluororad® FC-95, can also be used These acids and salts are believed to at least partially dissolve in the molten fluoropolymer.

Examples of inorganic foam cell nucleating agents include boron nitride as mentioned above, calcium tetraborate, talc, and metal oxides such as MgO, $Al_2O_3$, and $SiO_2$. The amount of foam cell nucleating agent used will depend on the particular nucleating agent used, the host polymer, and the increase in shear (production) rate desired above the maximum shear rate obtainable before surface roughening, such as gross melt fracture, is evident at the surface of the extrudate, when the nucleating agent is not present. Generally, 0.001 to 5 wt % foam nucleating agent can be used. Linear polyethylene seems to require only about 0.05 to 0.75 wt % of nucleating agent, except that boron nitride with and without thermally stable inorganic salt can be used in much smaller amounts as described above. The same is true for fluoropolymers. All %s disclosed herein are weight percent and are based on the total weight of the polymer plus nucleating agent. The foam cell nucleating agent may be a combination of inorganic agents or organic agents or a combination of inorganic and organic foam cell nucleating agents.

For fluoropolymers, the amount of nucleating agent will generally be from 0.001 to 0.5 wt %. The nucleating agent can be added to the polymer in the extruder or can be dry-mixed therewith prior to extrusion, with the goal being to obtain a uniform distribution of the nucleating agent within the molten polymer at least just prior to extrusion. The nucleating agent can be added to the polymer undiluted or the nucleating agent may be in the form of a concentrate of the nucleating agent in polymer (resin) which is the same as or is compatible with the polymer to be eventually extruded at high shear rate, i.e. the host polymer.

The particle size of the nucleating agent in the case of such agents which do not dissolve in the molten polymer is preferably in the range of 0.5 to 20 micrometers. The smaller the particle size, the more effective is the nucleating agent in enabling the shear rate to be increased at a given content of nucleating agent in the polymer. Examples of thermoplastic polymers which can be benefitted in accordance with the present invention include the polyolefins such as polypropylene, e.g. isotactic polypropylene, linear polyethylenes such as high density polyethylenes (HDPE), linear low density polyethylenes (LLDPE), e.g. having a specific gravity of 0.89 to 0.92. The relatively new linear low density polyethylenes made by the INSITE® catalyst technology of Dow Chemical Company and the EXACT® polyethylenes available from Exxon Chemical Company can also be benefitted from the present invention; these resins are generically called (mLLDPE). These linear low density polyethylenes are copolymers of ethylene with small proportions of higher alpha monoolefins, e.g. containing 4 to 8 carbon atoms, typically butene or octene. Any of these thermoplastic polymers can be a single polymer or a blend of polymers. Thus, the EXACT® polyethylenes are often a blend of polyethylenes of different molecular weights.

Examples of fluoropolymers include the melt-fabricable copolymers of tetrafluoroethylene with one or more fluorinated monomers such as fluoroolefins containing 1 to 8 carbon atoms, such as hexafluoropropylene, and fluoro(vinyl ethers) containing three to ten carbon atoms, such as perfluoro(alkyl vinyl ether), wherein the alkyl group contains 3 to 8 carbon atoms. Specific such monomers include perfluoro(ethyl or propyl vinyl ether). Preferably the fluoropolymer is perfluorinated and has a melt viscosity of $0.5 \times 10^3$ to $5 \times 10^6$ Pa.s at 372° C. These fluoropolymers are perfluorinated, but less than perfluorination can be used. For example, the fluorine content of the fluoropolymer is preferably at least 35 wt %. Examples of such polymers which are not perfluorinated and can be used include tetrafluoroethylene/ethylene and chlorotrifluoroethylene/ethylene copolymers.

From the diversity of the thermoplastic polymers, ranging from polyolefins to fluoropolymers, it is apparent that many other thermoplastic polymers are useful in the present invention. All such thermoplastic polymers have melt viscosities such that they are melt-extrudible.

The extrusion process of the present invention produces an unfoamed extrudate and unfoamed articles such as wire insulation, tubing, film and rods obtained from the extrudate. By extrusion of an unfoamed polymer in the process of the present invention is meant that neither the extrudate nor its articles are foamed. The extrudate and articles obtained from the extrudate may have a small percentage of voids resulting from air or other gas entering the extruder with the polymer feed, but such articles will nevertheless contain no more than 5% voids and preferably less, e.g. less than 3% voids, which would not be considered as a foamed extrudate or foamed article.

The improvement in shear rate without roughening of the surface of the unfoamed extrudate is shown in the Examples.

EXAMPLES

The equipment for determining the shear rate at which smooth extrudates can be produced involves both a rheometer and extrusion equipment. Both Teflon® FEP fluoropolymer resin and polyolefin resins were tested using these two sets of equipment.

The rheometers were standard laboratory rheometer equipment having a 90 degree die inlet angle.

The extrusion equipment involved an 31.725 mm Entwistle extruder having a 31/1 length to diameter ratio and equipped with a crosshead extrusion die. Extruder screw was a design standard for Teflon FEP® fluoropolymer resins. The crosshead was a Nokia Maillefer 4/6 or a B & H 75. The Nokia Maillefer crosshead had included cone angles (14 and 28 in the FIGURE) for the die and tip ("tip" is the wire guide such as wire guide 16 in the FIGURE) are equal at 60 degrees. The B & H crosshead was larger than the Nokia-Maillefer crosshead and had an included cone angle of the tip that was about 14 degrees and a die inlet angle of about 17 degrees. The die orifice/die tip had the following diameters:

|  | Nokia Maillefer 4/6 | B & H 75 |
| --- | --- | --- |
| Die Internal Diameter | 2.99 mm | 3.10 mm |
| Tip Outer Diameter* | 1.92 mm | 1.92 mm |

*A portion of the tip corresponding to cylindrical extension 24 of the figure.

A Brabender extruder was also used for producing polyolefin film for rheology testing. Table I reviews this extrusion equipment, the Entwistle equipement and includes the temperature profiles used.

TABLE I

| Extrusion Testing Conditions | | | |
| --- | --- | --- | --- |
| Extruder Diameter (mm) | | Entwistle | Brabender |
| Diameter (mm) | | 37.73 mm | 37.73 mm |
| L/D | | 31/1 | 25/1 |
| Screw Design | screw | Std. FEP | Barr screw |
| Crosshead/ Film Die | | Maillefer 4/6 Crosshead | Film Head* (6.34 mm inlet opening) |
| Die Details | | | |
| Die | | 2.99 mm | Film = 25.4 mm |
| Tip | | 1.52 mm | Wide & 0.508 mm thick |
| Temperatures | Teflon ® FEP ° C. | Polyolefin ° C. | Polyolefin ° C. |

TABLE I-continued

Extrusion Testing Conditions

| | | | |
|---|---|---|---|
| Rear Barrel | 371 | 163 | 150 |
| Center Rear Barrel | 371 | 163 | 180 |
| Center | 371 | 163 | 200 |
| Center Front | 371 | 163 | no zone on barrel |
| Front | 371 | 163 | 204 |
| Adaptor | 371 | 163 | — |
| Head | 371 | 163 | 204 |
| Die | 371 | 163 | 204 |
| Melt | 374–380 | 164–169 | 150–204 |
| Screw Speed | 5 to 100 RPM in 5 to 10 RPM Steps | | 5 to 100 RPM in 5 to 10 RPM Steps |
| Melt Pressure at Crosshead | Varies with screw speed to 34.4 Pa Maximum | | Varies with screw speed to 34.4 Pa Maximum |

*Die has the well-known "coat hanger" configuration to provide a streamline flow of the molten polymer through the die and across its width (film width).

Comparative Example 1

Teflon® FEP fluoropolymer grades TE 3100 and TE 4100 as virgin resins as well as TE 3100 containing 0.25% boron nitride and 0.011wt % calcium tetraborate (CTB) were tested in laboratory rheometers with the results shown in Table II and IIA. Two separate studies are listed, one at shear rates from 10 to 7000 reciprocal seconds (Table II) and the other from 10 to 2000 reciprocal seconds. (Table IIA).

In summary, almost identical performance is noted with the virgin resins and the boron nitride filled TE3100 resin in rheometer tests. Presence of boron nitride and CTB show essentially no difference in the surface character of the unfoamed beading extrudate.

TABLE II

Rheometer Testing of Teflon ® FEP Fluoropolymer Resin 350° C.

| Shear Rate | Surface Character of Rheometer Beading | | |
|---|---|---|---|
| (Sec$^{-1}$) | TE4100[2] | TE3100 | TE3100 |
| | Virgin Resin | Virgin Resin | 0.25% BN type SHP 325[4] 110 ppm CTB |
| 10 | Smooth | Smooth | Smooth |
| 30 | Smooth | Smooth | Transitioning to Sharkskin Sharkskin fracture related to die land starts here. |
| 100 | Sharkskin | Sharkskin | Sharkskin |
| 300 | " | " | " |
| 1000 | Smooth[3] | Not reported | " |
| 2000 | gross melt fracture | gross melt fracture | gross melt fracture |
| 4000 | " | " | " |
| 7000 | " | " | " |

[1]The shear rate through an annular orifice is calculated from the gap distance between the die and tip surface (H) and the circumfrence of the gap at its mid-point ($\pi$D, average diameter) from the following equation: The numerator is 6q wherein q = volumetric flow rate of molten FEP resin and the denominator is $H^2 \times \pi D$.
[2]Reference: Rosenbaum, Hatzikiriakos and Stewart "Flow Implications in the Processing of Tetrafluoroethylene/hexafluoropropylene Copolymers", Interpolymer Processing X, pub. by Hanser Publishers, Munich (1995).
[3]Supershear per U.S. Pat. No. 2,991,508
[4]Available from Carborundum Company

TABLE IIA

Teflon ® FEP TE-4100, TE-3100 fluoropolymer resins, each containing 0.025% BN type SHP325 and 110 ppm CTB
Laboratory Rheometer Test at 350° C.

| | Smoothness of Extrudate | |
|---|---|---|
| Shear Rate (sec$^{-1}$) | TE-4100 | TE-3100 |
| 10 | Smooth | Smooth |
| 30 | Smooth | Transition to rough |
| 100 | Sharkskin | Sharkskin |
| 300 | Stick slip* | Sharkskin |
| 1000 | Semi smooth | Sharkskin |
| 2000 | Gross melt fracture | Gross melt fracture |

*alternating smooth and gross melt fracture

Comparative Example 2

The TE3100 characterized above was evaluated in the Entwistle extruder using the conditions listed in Table I with the Nokia-Maillefer crosshead. Instead of beading, the extrudate was in the form of an unfoamed extruded tube. No foam cell nucleating agent was present. These data are listed in Table III.

Use of the Nokia-Maillefer crosshead provides a very streamlined flow of molten polymer. This postpones the point of sharkskin melt fracture from less than 100 reciprocal seconds in rheometer beading tests to approximately 300 reciprocal seconds in extrusion before melt fracture is encountered on the internal diameter surface of the tubing with virgin (no nucleating agent) resin.

TABLE III

TE3100 (virgin) Melt Flow Rate 17.3
Maillefer 2.99 mm die and 1.52 mm Tip
Standard FEP Screw in Entwistle Extruder

| RPM | Melt Temperature ° C. | Output g/min. | Calculated Shear Rate sec-1 | Smoothness of Extrudate ID & OD |
|---|---|---|---|---|
| 0.9 | 371 | 5 | 100 | Smooth ID & OD |
| 1.8 | 372 | 8 | 150 | Smooth ID & OD |
| 3.5 | 373 | 17 | 320 | Smooth OD Sharkskin ID |
| 7.0 | 373 | 34 | 620 | Smooth OD Sharkskin ID |
| 15.0 | 374 | 75 | 1320 | Sharkskin |
| 30.0 | 374 | 155 | 2720 | Sharkskin |
| 40.0 | 376 | 208 | 3650 | gross melt fracture |
| 50.0 | 377 | 251 | 4300 | gross melt fracture |
| 60.0 | 378 | 304 | 5200 | gross melt fracture |
| 65.0 | 379 | 320 | 5600 | gross melt fracture |

In the following examples, it will be shown that completely different performance occurs in melt extrusion with foam cell nucleating agents present in the extruded polymer.

Example 1

Comparative Example 2 was repeated except that the TE3100 resin contained 0.25 wt % boron nitride and 0.011 wt % CTB. Both surfaces of the extruded tube were smooth (no sharkskin or gross melt fracture) from the low shear rate of 100 reciprocal seconds to >4500 reciprocal seconds. These data are in Table IV. The surface smoothness encompasses the rheology range from sharkskin fracture well into the range of gross melt fracture. The shear rate of this Example was at least 10x the earliest occurrence of surface roughness in Comparative Example 2.

TABLE IV

TE3100, with 0.25% BN, Type SHP325, 110 ppm CTB
Maillefer 2.99 mm die, 1.52 Tip in Standard
FEP Screw in Entwistle Extruder

| RPM | Melt Temperature °C. | Output g/min. | Calculated Shear Rate sec$^{-1}$ | Smoothness of Extrudate ID & OD |
|---|---|---|---|---|
| 0.9 | 373 | 5 | 100 | Smooth |
| 1.8 | 373 | 8 | 150 | Smooth |
| 3.5 | 373 | 17 | 400 | Smooth |
| 7.0 | 374 | 35 | 700 | Smooth |
| 15.0 | 374 | 76 | 1300 | Smooth |
| 30.0 | 374 | 158 | 2700 | Smooth |
| 40.0 | 375 | 201 | 3500 | Smooth |
| 50.0 | 376 | 244 | 4200 | Smooth |
| 60.0 | 377 | 263 | 4500 | Smooth |

In the subsequent Examples, the extrusion tests of resin samples (Table V data) were conducted in a similar fashion. In some of these examples, instead of presenting all the data from 5 to 70 screw RPM, the point where the extrudate transitions from smooth to fractured is noted.

Example 2

Data in Table V show various foam cell nucleating agents allowing the unfoamed tubular extrudate smoothness to be extended to different levels of shear rate before surface ski roughness appeared. The surface roughness appearing on the inner diameter (surface) of the extrudate using 3300 ppm (0.33 wt %) BaS-10 was eliminated by increasing the BaS-10 concentration to 5000 ppm.

The additive providing the best extension of extrusion rate was 0.25% boron nitride and 330 ppm CTB. And specifically, the best boron nitride is type PSSP150 and also type HCV. Examination at three magnifications show the surface of the extrudates containing the PSSP150 or the HCV boron nitride to be remarkably smooth and free of defects. So far, the maximum smooth surface performance has been to a 6000 reciprocal second shear rate value with TE4100 containing BN type HCV. This is far beyond land fracture (sharkskin) and onset of die inlet fracture (gross melt fracture) noted in rheometer and extrusion testing of the virgin TE4100.

Some variability has been noted over four separate test extrusion evaluations of the same and also of different master batches of TE4100 containing 400 ppm CTB. Similar variations were noted in extrusion tests with 400 ppm zinc borate in TE 4100. CTB seems to function with more uniform performance when it is the secondary component as in BN/CTB.

TABLE V

Influence of Foam Cell Nucleating Agents on Rheology and Tubing Surface Smoothness
Extrusion Tests in the Entwistle Extruder using a Maillefer 4/6 Crosshead and melt Extrusion
Temperature of 383° C. with no melt draw

| | | Maximum Shear Rate in sec$^{-1}$ at which the ID or OD Surface of the tubing is Smooth*. In addition, the surface smoothness is rated E to A. A rating of A+++ denotes excellent surface smoothness by the naked eye and by scanning electron photographs at 25×, 500× and 1000×. | |
|---|---|---|---|
| | | Outer Diameter | Inner Diameter |
| TE4100 | 3300 ppm BaS-10 | 3000B | 300A |
| TE4100 | 5000 ppm BaS-10 | 5000B | >6500B |
| TE4100 | 400 ppm MgO | 3700B | >6500B |
| TE4100 | 0.25% talc + 110 ppm CTB | 6500B | >6500B |
| TE4100 | 1.25% PTFE 110 | 3000B | 2700B |
| TE4100 | 0.5% PTFE 1100 | 1000B | 3000B |
| TE4100 | 0.5% PTFE 1100 | 1000B | 900B |
| TE4100 | 800 ppm CTB | 1000B | 800B |
| TE4100 | 400 ppm CTB | 4000B | >6500B |
| TE4100 | 400 ppm CTB | 500B | 600B |
| TE4100 | 400 ppm CTB | 0–500B 4500–5000B* | 4000B |
| TE4100 | 800 ppm BaS-10 and 100 ppm CTB | 4000B | 4000B |
| TE4100 | 2500 ppm BaS-10 and 100 ppm | >6000B | >6000B |
| TE4100 | 0.25% BN(3030) + 110 ppm CTB | >6000 | >6000 |
| TE4100 | 0.25% BN (SHP325) 110 ppm CTB | >5500B | >5500B |
| TE4100 | 0.25% BN (HCV) 110 ppm CTB | >6000A+ | >6000A+ |
| TE4100 | 0.25% BN (HCV) 330 ppm CTB | >6000A+++ | >6000A+++ |
| TE4100 | 0.25% BN (PSSP150) 330 ppm CTB | >3750A+++ | >3750A+++ |
| TE4100 | 0.25% BN (PSSP151) 330 ppm CTB | >3750A | >3750A |
| TE4100 | 0.25% BN (PHPP325) 330 ppmk CTB | >3750A | >3750A |
| TE4100 | 0.03% BN (PSSP325) 30 ppm CTB | >3750A | >3750A |
| TE4100 | 0.03% BN (PSSPl51) 30 ppm CTB | 0 to 350A, 3500 to 5086A* | 0 to 350A, 3500 to 5086A |

*Shear rate range denotes smooth surface extrudate production.
NOTE 1 The HCV is available from Advanced Ceramics Corp and the PSSP 150, 151, 325 and 3030 grades of BN are available from Carborundum Company.
NOTE 2. The gap in surface smoothness shear rates, e.g. between 500 sec$^{-1}$ and 4500 sec$^{-1}$ when 400 ppm CTB was used indicates that surface roughness was present at shear rates within the gap.
NOTE 3. The E to A rating system for smooth surfaces is used in later Examples.

Comparing Foam Nucleation Efficiency to Extrusion Rheology Improvement Performance The efficiency of boron nitride as a foam nucleant and as a rheology improver for unfoamed extrudable is compared in Table VI.

TABLE VI

Comparison of Foam Nucleation Vs. Rheology Improver in Teflon FEP Fluoropolymer Resin

| | Foam RG-62 core Av. Dia. Foam Cells | (20 ft/min.) % Voids (and cells/cc) | Rating as a Foam Cell Nucleant (from cell count) | Rating as a Rheology Improver (unfoamed Extrudate Table V) |
|---|---|---|---|---|
| 0.5% BN, type SHP 325 | 12 mils | 56% (32,000 cells/cc) | Good | Good |
| 0.5% BN, type HCV | 30 mils | 59% (25 cells/cc) | Poor | Excellent (6,000 A) |

The Table Shows that the better nucleating agent for making a foamed extrudate (type SHP 325) is less effective in improving extrusion performance of unfoamed extrudate, type HCV BN being more effective than type SHP 325 in that regard. The HCV and PSSP150 types of BN were characterized by a very small particle size, less than 5 micrometers, usually 2–5 micrometers, while the SHP 325 type had a larger particle size.

In addition, U.S. Pat. No. 4,764,538 shows the best foaming efficiency with boron nitride (type SHP 325) occurs at 90 to 190 ppm added CTB. The present rheology work shows the best performer is boron nitride (type PSSP150 and also HCV), but the CTB level should be near 330 ppm.

Example 3

Tests show the boron nitride can be reduced to levels of 0.025% (250 ppm) and the good surface smoothness rheology performance is maintained. These data are shown in Table VII. In this test procedure, the entire span of screw speed of the Entwistle extruder using the Nokia-Maillefer crosshead was studied as in the other examples. The data of the table denote points where the tube extrudate is smooth and where melt fracture returned.

At very low values of boron nitride concentration, the shear rate mid-point of the zone where melt fracture re-occurs trends to lower values with lower concentrations of boron nitride. For example, at 0.0125% BN the mid-point of the melt fracture zone is 3700 reciprocal seconds and the zone width is 500 reciprocal seconds. At 0.005%, this mid-point has drifted down to 1400 reciprocal seconds and the zone width is 400 reciprocal seconds.

TABLE VII

Teflon ® TE 3100 FEP Fluoropolymer Resin
Influence of Boron Nitride/CTB Level upon Tubular Extrudate Surface Smoothness BN type SHP325-Melt Extrusion Temperature 383° C.

| | | Maximum Shear Rate in sec$^{-1}$ to yield surface smoothness | |
|---|---|---|---|
| | | OD | ID |
| Virgin TE3100 | | 500A | 300A |
| TE3100+ | 0.25% (2,500 ppm) BN (SHP325) + 110 ppm CTB | >5500A | >5500A |
| TE3100+ | 0.125% (1200 ppm) BN (SHP325) + 55 ppm CTB | >5500A | >5500A |
| TE3100+ | 0.06% (600 ppm) BN (SHP325) + 27 ppm CTB | >5500A | >5500A |
| TE3100+ | 0.025% (250 ppm) BN (SHP325) + 11 ppm CTB | >5500A | >5500A |
| + | 0.0125% (125 ppm) BN (SHP325) + 5 ppm CTB | 0 to 3500A 4000 to 5500A* | 0 to 3500A 4000 to 5500A |
| + | 0.0083% (83 ppm) BN (SHP325) + 3 ppm CTB | 0 to 2500A 2800 to >5500A | 0 to 2500A 2800 to >5500A |
| + | 0.0050% (50 ppm) BN (SHP325) + 2 ppm CTB | 0 to 1200A 1600 >5500A | 0 to 1200A 1600 >5500A |

*The gap between shear rates at which surface smoothness occurred was characterized by surface roughness, e.g. in the shear rate range of 3500 to 4000 sec$^{-1}$ for the composition containing 0.0125 wt % BN and 5 ppm CTB.

Example 4

Teflon® FEP fluoropolymer grade 100, a resin of higher melt viscosity than TE 3100 and TE 4100, was checked for rheology performance in the Entwistle extruder using both the Nokia-Maillefer 4/6 crosshead and also with the B & H 75 crosshead. At comparable resin output, the melt pressure or shear stress in the Maillefer head was approximately 35% less.

The higher molecular weight of the FEP100 versus the resins described in the previous examples makes the maximum shear rate limit for smooth surface unfoamed tubing occur at a significantly lower value. Extrudate surface smoothness could be obtained at higher shear rates by increasing the melt temperature above 383° C.

The testing progressed to fully let down resin and then to added CTB, the point where melt fracture was at higher and higher shear rates reaching a final level of 2900 reciprocal seconds. This probably occurs due to better and better mixing of the additive in the resin. These data are shown in Table VIII.

Example 5

Comparative Example 3 was repeated, except that the TE3100 was melt compounded with a concentrate made in a twin screw extruder. The concentrate contained 0.25% boron nitride type SHP 325 and 110 ppm CTB. It was let down with additional TE3100 in the Entwistle extruder and put to cubes having a final loading of 0.06% BN and 27 ppm CTB and having a melt flow rate of 18.

This resin was extruded as unfoamed insulation onto wire using a 0.145 inch (3.68 mm) die and a 0.078 inch (1.98 mm) tip using the Nokia Maillefer cross-head on a 45 mm Nokia Maillefer extruder. The extruder screw has a standard design. The extrusion condition on the 45 mm line is as follows:

| Rear | Center Rear | Center | Center Front | Front | Clamp | Adaptor | Crosshead |
|---|---|---|---|---|---|---|---|
| 602° F. (316° C.) | 700° F. (371° C.) | 700° F. (371° C.) | 700° F. (371° C.) | 700° F. (371° C.) | 685° F. (363° C.) | 684° F. (362° C.) | 755° F. (401° C.) |

TABLE VIII

Teflon ® 100 FEP Fluoropolymer Resin
Maximum Shear Rate (reciprocal seconds) for Smooth Surface
Tube Extrusion Melt Extrusion Temperature 383° C.

| | | OD of Core | ID of Core |
|---|---|---|---|
| Virgin FEP100 | | 200A* | 150A* |
| FEP100+ | 0.5% BN (SHP325) | 1500A | 1500A |
| FEP100+ | 0.55% BN (SHP325)** | 1600A | 1600A |
| FEP100+ | 0.25% BN (SHP325) + 110 ppm CTB*** | 2400A | 2900A |
| FEP100+ | 800 ppm BaS-10* | 2000B | 2000B |

*No supershear window in tests to 6000 sec$^{-1}$ with virgin T-100 resin.
**Let down in extrusion testing at 9/1 from a 5% BN concentrate, i.e. the concentrate was melt blended in the Entwistle extruder as the extrusion occurred.
***Fully let down in a prior extrusion, i.e. the composition was blended in a twin-screw extruder to form extruded cubes of the composition, and this composition was fed to the Entwistle extruder.

Comparative Example 3

Entwistle extrusion tests on Teflon® TE3100 and TE4100 resin will result in gross melt fracture point at the shear rates indicated using the Nokia-Maillefer crosshead. The maximum wire coating speed for a final FEP wall thickness of 0.007 inch (0.1777 mm) having smooth surfaced ID and OD on the melt cone are calculated from the meximum shear rate in the table below.

The screw speed was 20 rpm, and the melt temperature was 708° F. (376° C.), and a melt pressure of 9.4 MPa.

The extrusion was successfully run to smooth inner and outer insulation surfaces at 851 ft/min (258 meters per min). This corresponds to a shear rate of 2200 reciprocal seconds. This shear rate and wire speed were about 10 times greater than what could be achieved with this same die/tip set up using virgin TE3100 FEP resin and smooth surfaced wire insulation. The electrical flaw count associated with the coated wire amounted to only one flaw per 3000 ft (909 meters).

Example 6

Comparative Example 3 was repeated, except that the TE4100 was melt compounded from a concentrate made on a twin screw extruder. The concentrate contained 0.25% BN, type HCV. It was let down with additional TE4100 in the Entwistle extruder to a final pelleted composition containing 0.05% BN, and was of melt flow rate 23.

In this case, the BN modified TE4100 resin could be extruded at 5000 reciprocal seconds and 2000 ft/min (609 meters/min).

The extrusion rate of 2000 ft/min (609 m/min) was about thirteen times 154 ft/min (47 m/mm) rate associated with smooth surfaced (ID & OD) wire insulation of the virgin TE4100 in tooling #2 of the Table. The boron nitride agent allowed this higher speed extrusion at low draw down (24/1) in Comparative Example 3 and high shear rate (4300 sec$^{-1}$).

The extrusion conditions on the 45 mm Nokia-Maillefer extrusion line were as follows:

| | Internal Diameter | Crosshead, Set #1 | Crosshead, Set #2 |
|---|---|---|---|
| Resin and MFR (Melt flow rate) | Critical Shear Rate in Maillefer crosshead Die = 0.118" (3.0 mm) | Maximum Extrusion Rate for 7 mil (0.177 mm) | Test Extrusion Set up for 7 mil (0.177 mm) wall on AWG 24 solid wire (0.0201", 0.51 mm) |
| | Tip = 0.60" (1.5 mm) | wall on AWG 24 solid wire (0.0201", 0.51 mm) | |
| | 371° C. 700° F. (reciprocal seconds) | Die = 0.238" (6.0 mm) Tip = 0.135" (3.4 mm) Draw down ratio 51/1 Draw balance = 1.04 | 0.145" (3.7 mm) 0.078 (2.0 mm) Draw down ratio 20/1 Draw balance = 1.10 |
| TE3100 18 MFR | | 343 ft/min (104 m/min) | 87 ft/min (27 m/min) |
| TE4100 22 MFR | | 610 ft/min (186 m/min) | 154 ft/min (47 m/min) |

| Rear | Center Rear | Center | Center Front | Front | Clamp | Adaptor | Crosshead |
| --- | --- | --- | --- | --- | --- | --- | --- |
| 690° F. (366° C.) | 700° F. (371° C.) | 700° F. (371° C.) | 700° F. (371° C.) | 700° F. (371° C.) | 730° F. (388° C.) | 730° F. (388° C.) | 750° F. (399° C.) |

Screw Rpm was 42, the melt 757° F. (402° C.) with a melt pressure of 5.5 MPa through the die of 0.145" (3.7 mm) and tip 0.075" (1.9 mm).

The wire insulations of Comparative Example 3 and Examples 5 and 6 were unfoamed.

Comparative Example 4

LLDPE polyethylene resin DFDA7047, a standard in rheology studies, was used along with a metallocene catalyzed polyethylene grade, coded Exact® 3028, for the base virgin resins studies in the Entwistle extruder. The Nokia-Maillefer crosshead used in the extrusion studies had enlarged to 3.10 mm die opening while the 1.92 mm tip was still the same size to make unfoamed tubular extrudate.

In laboratory rheometer studies, each of these resins possess a critical shear rate under 100 reciprocal seconds. Using the Entwistle extruder, the following results were obtained:

|  | Shear Rate (Reciprocal seconds) | |
| --- | --- | --- |
|  | DFDA7047 | Exact ® 3028 |
| Smooth Tubing Extrudate | 70 | 44 |
| Zone of Sharkskin Melt Fracture | 114 to 930 | 90 to 144 |
| Zone of Gross Melt Fracture | 1812 to 3450 | 280 to 2400 |

Examples 6 and 7

High boron nitride compositions of 1000 ppm CTB and 2, 5 and 10% boron nitride, type SHP325, all allowed the unfoamed tubing of DFDA7047 polyethylene to be smooth to approximately 1000 reciprocal seconds which is much greater than the 114 sec$^{-1}$ for this resin as shown above. These compositions were run under the conditions of Table I for polyolefin resins.

The following compositions of Exact® 3028 resin were also found to form smooth-surface unfoamed tubing at 1000 reciprocal seconds:

1% boron nitride, type SHP325, and 500 ppm CTB 0.5% boron nitride, type SHP325, and 250 ppm CTB Following this extrusion, a composition containing the Exact® resin which also contained 0.05% boron nitride, type SHP325 and 10 ppm CTB was successfully run as unfoamed tubing for a two hour period at 627 reciprocal seconds and was completely free of any melt fracture, as compared to only 90 sec–1 for this resin containing no nucleating agent.

Following this, virgin Exact® resin 3028 was run as unfoamed tubing at the same shear rate for an additional two hour period completely free of melt fracture. The extruder hold up was about 200 grams of polyethylene. At this shear rate, the output in grams per minute was 21 grams per minute or 2520 grams in two hours. The held up resin in the extruder changed over about a dozen times during the two hour period. During this run with virgin 3028 resin, the amount of BN and CTB present in the extruder from the preceding run was continuously reduced to much smaller amounts, e.g. 0.005 diminishing to 0.001 wt % for the BN, and the extrudability improving effect of the BN was still exhibited by the extrudate. Photographs at 1000× showed boron nitride particles in the outer surface of the tubing after this two hours of running the virgin 3028 resin.

Example 8

LLDPE polyethylene GRSN7047 resin powder was evaluated with and without the boron nitride additive in the film extrusion equipment described in Table I. The gross melt fracture occurring a 1240 reciprocal seconds with the virgin polyethylene resin disappeared with 0.2% (2000 ppm) boron nitride, type SHP325 and 100 ppm CTB. Sharkskin melt fracture occurred to the limit of testing, 2800 reciprocal seconds for the polyethylene resin containing the nucleating agent, and gross melt fracture never occurred. Data are in Table IX.

TABLE IX

Polyethylene Type GRSN7047 Film Extrusion without and with boron nitride additive

| Rheology Shear Rate Reciprocal Seconds | Virgin GRSN7047 | GRSN7047 0.2% BN Type SHP325 100 ppm CTB |
| --- | --- | --- |
| 200 | Smooth | Not run |
| 440 | Sharkskin | Sharkskin |
| 1040 | Sharkskin | Sharkskin |
| 1380 | Slip Stick | Sharkskin |
| 1600 | Gross Melt Fracture | Sharkskin |
| 2200 | Gross Melt Fracture | Sharkskin |
| 2600 | Gross Melt Fracture | Sharkskin |

In many cases of production, the sharkskin surface with it's sandpaper texture can be tolerated and in some rare cases, preferred. The gross melt fracture, on the other hand cannot be tolerated because the surface would have unacceptable surface smoothness. With gross melt fracture there would be an unacceptable surging of molten resin in film production leading to very undesirable thickness variations. These observations apply to all thermoplastic polymers.

Example 9

In this Example the unfoamed extrudate is in the form of beading (solid extrudate) and the extrusion equipment is a rheometer having a die inlet angle of 90 degrees and die orifice 0.762 mm in diameter and the die land length-to-diameter ratio was 40:1. In one experiment, the polymer used was TE4100 fluoropolymer, which could be extruded at a shear rate up to 55 sec$^{-1}$ before the beading surface exhibited a sharkskin appearance. The extrusion melt temperature was 325° C. This experiment was repeated except that the TE4100 was premelt blended with foam cell nucleating agent: 0.25 wt % BN, 0.011 wt % CTB, and 0.008 wt % BaS-10. Surface roughness did not occur until the shear rate reached 70 sec$^{-1}$. As shear rate increased about 70 sec$^{-1}$, the surface roughness (stick-slip) was at a much lower degree than the surface roughness present as the shear rate increased above 70 sec$^{-1}$ for the fluoropolymer containing no foam cell nucleating agent. Gross melt fracture occurred at 1350 sec$^{-1}$ for the resin without foam cell nucleating agent, while gross melt fracture was delayed until 1500 sec–1 when the resin containing the foam cell nucleating agent was present.

Whereas previous rheometer extrusions did not show improvement when foam cell nucleating agent was present, the improvement obtained in this series of experiments indicate the effectiveness of particular agents to produce laminar flow where the equipment might otherwise produce only turbulent flow.

We claim:

1. Composition comprising thermoplastic polymer and 0.001 to 0.015 wt % boron nitride, said thermoplastic polymer being polypropylene or linear polyethylene.

2. Composition of claim 1 wherein said thermoplastic polymer is linear polyethylene.

3. Composition comprising fluoropolymer and 0.001 to 0.015 wt % of boron nitride.

4. Composition of claim 3 wherein said fluoropolymer is perfluoropolymer.

5. Composition of claim 1 having thermally stable inorganic salt present therein.

6. Composition of claim 5 wherein the concentration of said salt is 0.002 to 0.04 wt %.

7. The composition of the claim 1 wherein the amount of said boron nitride is 0.005 to 0.01 wt %.

* * * * *

UNITED STATES PATENT AND TRADEMARK OFFICE
CERTIFICATE OF CORRECTION

PATENT NO.    : 5,945,478
DATED         : August 31, 1999
INVENTOR(S)   : Marlin Dwight Buckmaster, et. al.

It is certified that error appears in the above-identified patent and that said Letters Patent is hereby corrected as shown below:

The Title page, showing an illustrative figure, should be deleted and substitute therefor the attached Title page.

Drawings:

Delete Fig. 1 and substitute therefor the attached Fig. 1.

Signed and Sealed this

First Day of August, 2000

Attest:

Q. TODD DICKINSON

*Attesting Officer*  *Director of Patents and Trademarks*

United States Patent [19]
Buckmaster et al.

[11] Patent Number: 5,945,478
[45] Date of Patent: Aug. 31, 1999

[54] HIGH SPEED EXTRUSION

[75] Inventors: Marlin Dwight Buckmaster, Vienna, W. Va.; Stuart Karl Randa, Wilmington, Del.

[73] Assignee: E. I. du Pont de Nemours and Company, Wilmington, Del.

[21] Appl. No.: 08/881,957

[22] Filed: Jun. 25, 1997

Related U.S. Application Data

[62] Division of application No. 08/632,376, Apr. 10, 1996, Pat. No. 5,688,457.

[51] Int. Cl.$^6$ .................................................. C08K 5/02
[52] U.S. Cl. .................... 524/650; 524/700; 524/701; 524/714; 524/742; 524/745; 524/779; 524/792; 524/795
[58] Field of Search ............................. 524/650, 700, 524/701, 714, 742, 745, 779, 792, 795

[56] References Cited

U.S. PATENT DOCUMENTS

| | | |
|---|---|---|
| 3,072,583 | 1/1963 | Randa. |
| 3,125,547 | 3/1964 | Blatz. |
| 4,304,713 | 12/1981 | Perelman ........................... 264/45.9 |
| 5,180,754 | 1/1993 | Morita et al. ......................... 521/85 |
| 5,314,925 | 5/1994 | Burnell et al. ........................ 521/92 |
| 5,340,843 | 8/1994 | Tsuruta et al. ....................... 521/79 |
| 5,346,926 | 9/1994 | Sakamoto et al. .................... 521/81 |

FOREIGN PATENT DOCUMENTS

| | | |
|---|---|---|
| 0504418 A1 | 9/1992 | European Pat. Off. . |
| 04-93221 | 3/1992 | Japan . |

OTHER PUBLICATIONS

Rudin et al., "Fluorocarbon Elastomer aids polyolefin extrusion", Plastics Engineering, pp. 63–66 Mar. 1986.

*Primary Examiner*—John M. Cooney, Jr.

[57] ABSTRACT

Extrusion rheology of thermoplastic polymer as manifested by surface smoothness is improved by incorporating foam cell nucleating agents into the polymer and extruding the polymer under laminar flow to form unfoamed extrudate.

7 Claims, 1 Drawing Sheet

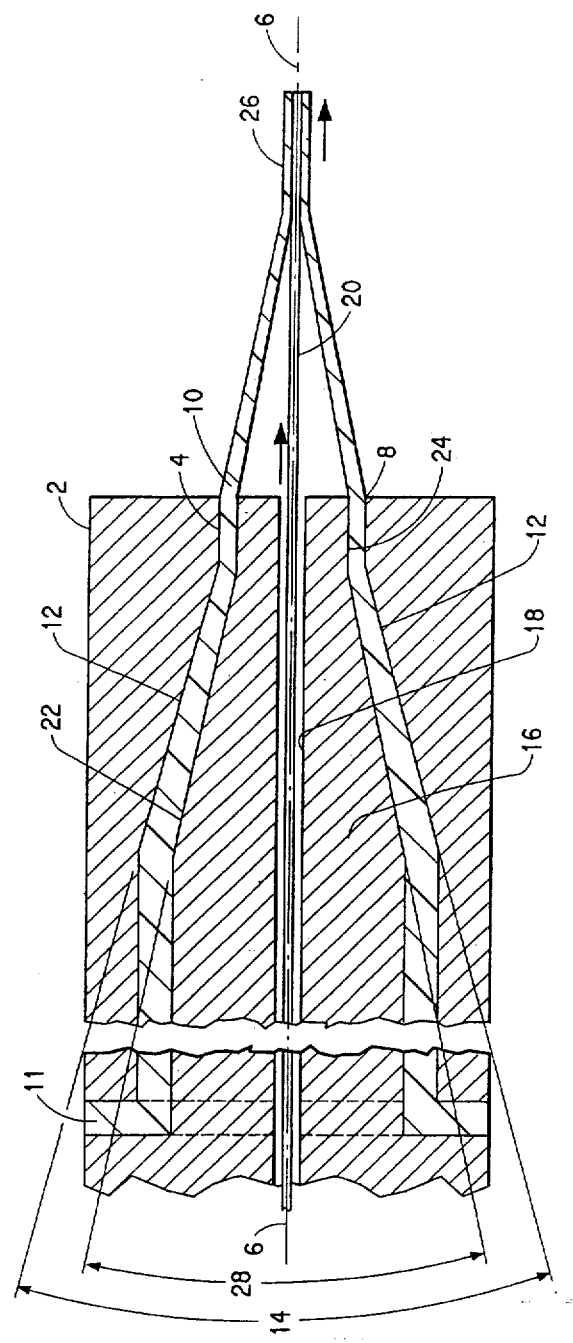
FIGURE